(12) United States Patent
Boillot

(10) Patent No.: US 8,578,282 B2
(45) Date of Patent: Nov. 5, 2013

(54) VISUAL TOOLKIT FOR A VIRTUAL USER INTERFACE

(75) Inventor: Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 1661 days.

(21) Appl. No.: 11/683,413

(22) Filed: Mar. 7, 2007

(65) Prior Publication Data

US 2007/0220437 A1 Sep. 20, 2007

Related U.S. Application Data

(60) Provisional application No. 60/782,252, filed on Mar. 15, 2006.

(51) Int. Cl.
*G06F 3/00* (2006.01)

(52) U.S. Cl.
USPC .............................. 715/762; 710/9; 715/771

(58) Field of Classification Search
USPC .......................................... 715/776, 863, 864
See application file for complete search history.

(56) References Cited

U.S. PATENT DOCUMENTS

| | | | | |
|---|---|---|---|---|
| 4,506,354 A * | 3/1985 | Hansen | | 367/101 |
| 5,168,531 A * | 12/1992 | Sigel | | 382/291 |
| 5,274,363 A | 12/1993 | Koved | | |
| 5,594,469 A * | 1/1997 | Freeman et al. | | 345/158 |
| 5,680,605 A * | 10/1997 | Torres | | 707/3 |
| 5,760,773 A * | 6/1998 | Berman et al. | | 715/808 |
| 5,781,894 A * | 7/1998 | Petrecca et al. | | 705/14.4 |
| 5,844,554 A * | 12/1998 | Geller et al. | | 715/744 |
| 6,002,808 A * | 12/1999 | Freeman | | 382/288 |
| 6,002,867 A * | 12/1999 | Jazdzewski | | 717/105 |
| 6,011,537 A * | 1/2000 | Slotznick | | 715/733 |
| 6,072,494 A * | 6/2000 | Nguyen | | 715/863 |
| 6,130,663 A * | 10/2000 | Null | | 345/158 |
| 6,137,427 A | 10/2000 | Binstead | | |
| 6,185,586 B1 * | 2/2001 | Judson | | 715/207 |
| 6,237,135 B1 * | 5/2001 | Timbol | | 717/107 |
| 6,310,629 B1 * | 10/2001 | Muthusamy et al. | | 715/727 |
| 6,313,825 B1 | 11/2001 | Gilbert | | |
| 6,314,559 B1 * | 11/2001 | Sollich | | 717/111 |
| 6,377,281 B1 * | 4/2002 | Rosenbluth et al. | | 715/700 |
| 6,573,883 B1 * | 6/2003 | Bartlett | | 345/156 |
| 6,614,422 B1 * | 9/2003 | Rafii et al. | | 345/168 |
| 6,624,833 B1 * | 9/2003 | Kumar et al. | | 715/863 |
| 6,671,853 B1 * | 12/2003 | Burkett et al. | | 715/235 |
| 6,683,625 B2 * | 1/2004 | Muthusamy et al. | | 715/764 |
| 6,757,002 B1 * | 6/2004 | Oross et al. | | 715/864 |
| 6,842,175 B1 * | 1/2005 | Schmalstieg et al. | | 345/427 |
| 6,937,227 B2 | 8/2005 | Qamhiyah | | |
| 7,078,911 B2 | 7/2006 | Cehelnik | | |
| 7,081,884 B2 | 7/2006 | Kong | | |
| 7,092,109 B2 | 8/2006 | Satoh | | |
| 7,116,310 B1 * | 10/2006 | Evans et al. | | 345/156 |
| 7,130,754 B2 | 10/2006 | Satoh | | |
| 7,145,552 B2 * | 12/2006 | Hollingsworth | | 345/168 |

(Continued)

*Primary Examiner* — Boris Pesin
*Assistant Examiner* — Henry Vuu

(57) ABSTRACT

An Integrated Development Environment (IDE) (100) for creating a touchless Virtual User Interface (VUI) 120 is provided. The IDE can include a development window (152) for graphically presenting a visual layout of user interface (UI) components (161) that respond to touchless sensory events in a virtual layout of virtual components (261), and at least one descriptor (121) for modifying a touchless sensory attribute of a user component. The touchless sensory attribute describes how a user component responds to a touchless touchless sensory event on a virtual component.

18 Claims, 4 Drawing Sheets

(56) References Cited

U.S. PATENT DOCUMENTS

| | | | |
|---|---|---|---|
| 7,240,072 B2* | 7/2007 | McKnight et al. | 1/1 |
| 2001/0024213 A1* | 9/2001 | Doi et al. | 345/863 |
| 2002/0002568 A1* | 1/2002 | Judson | 707/513 |
| 2002/0080193 A1* | 6/2002 | Muthusamy et al. | 345/848 |
| 2002/0118880 A1* | 8/2002 | Liu et al. | 382/199 |
| 2002/0181773 A1* | 12/2002 | Higaki et al. | 382/190 |
| 2003/0048312 A1* | 3/2003 | Zimmerman et al. | 345/863 |
| 2003/0070006 A1* | 4/2003 | Nadler et al. | 709/330 |
| 2003/0071845 A1* | 4/2003 | King et al. | 345/764 |
| 2003/0185444 A1* | 10/2003 | Honda | 382/186 |
| 2004/0095384 A1* | 5/2004 | Avni et al. | 345/745 |
| 2005/0024341 A1* | 2/2005 | Gillespie et al. | 345/173 |
| 2005/0088409 A1* | 4/2005 | Van Berkel | 345/157 |
| 2005/0088416 A1* | 4/2005 | Hollingsworth | 345/173 |
| 2005/0137648 A1* | 6/2005 | Cosendai et al. | 607/48 |
| 2005/0245302 A1* | 11/2005 | Bathiche et al. | 463/1 |
| 2006/0010400 A1* | 1/2006 | Dehlin et al. | 715/856 |
| 2006/0031661 A1* | 2/2006 | Takayama et al. | 712/205 |
| 2006/0074735 A1* | 4/2006 | Shukla et al. | 705/8 |
| 2006/0085757 A1* | 4/2006 | Andre et al. | 715/771 |
| 2006/0085767 A1* | 4/2006 | Hinckley et al. | 715/863 |
| 2006/0092022 A1 | 5/2006 | Cehelnik | |
| 2006/0098873 A1* | 5/2006 | Hildreth et al. | 382/181 |
| 2006/0161871 A1* | 7/2006 | Hotelling et al. | 715/863 |
| 2006/0236254 A1* | 10/2006 | Mateescu et al. | 715/762 |
| 2006/0238490 A1* | 10/2006 | Stanley et al. | 345/156 |
| 2006/0256090 A1 | 11/2006 | Huppi | |
| 2007/0011620 A1* | 1/2007 | Mendel et al. | 715/762 |
| 2007/0055964 A1* | 3/2007 | Mirkazemi et al. | 717/140 |
| 2009/0043195 A1* | 2/2009 | Poland | 600/437 |

* cited by examiner

VISUAL TOOLKIT FOR A VIRTUAL USER INTERFACE

CROSS-REFERENCE TO RELATED APPLICATIONS

This application claims the priority benefit of U.S. Provisional Patent Application No. 60/782,252 entitled "Visual Toolkit for a Sensory User Interface" filed Mar. 15, 2006.

This application also incorporates by reference the following Applications: 11/683,410 entitled "Method and Device for Three-Dimensional Sensing", 11/683,412 entitled "Application Programming Interface (API) for Sensory Events", 11/683,415 entitled "Virtual User Interface Method and Device Thereof", and 11/683,416 entitled "Touchless Tablet Method and Device Thereof" all filed on the same day as this Application.

FIELD

The present embodiments of the invention generally relate to the field of software programming, more particularly to programming development environments.

BACKGROUND

Integrated Development Environments (IDE) assist developers with writing and debugging code during the creation of software applications. An IDE provides tools or modules that a developer can employ to facilitate rapid and quality development of code. The tools and modules provide functionality through program reference libraries or from device drivers that provide a layer of abstraction from the underling hardware resources. An IDE can be a compositional studio wherein a programmer can build code using facilities offered by the IDE. An IDE can contain a set of classes or libraries in a particular format which a developer can reference during code creation. The classes or libraries may be associated with a particular software process, or a hardware resource. An IDE provides an integrated approach to program development in that programs or utilities are available from directly within the IDE for creating the software application. For example, an IDE can support a programming language, a compiler, a linker, and a debugger. A multitude and variation of these resources can be provided to give the developer flexibility in using one resource over the other, and to use them together. An IDE can employ an object oriented programming languages to facilitate ease of development. Various levels of programming such as providing access to functions, methods, variables, data, and classes can be provided through the IDE to allows the developer immediate access to the underlying code. The levels of access target a specific feature that is generally already available within the levels of programming. The parameters can be precipitated from the underlying native code to a user interface, allowing a developer to adjust aspects of the programming within the IDE.

An IDE is a packaged environment that contains a collection of programs and modules that together facilitate the ease of code development. The IDE manages interaction within the modules and coordinates the building of code. An IDE can be targeted to various target platforms wherein programming operations of the platform are already available. An IDE is in general a wrapper for functions and processes already available on the target platform or device. The target platform generally provides an Applications Programming Interface that tells the IDE how to interface with the underlying platform or software processes. An IDE can interface with an API for understanding how to package the code development program and modules. The API opens up a set of communication protocols that can accessed by outside developers or the IDE. The communication protocols allow access for communicating with the underlying resources or behaviors of the platform. However, different devices support various access functions which may not be available in APIs or IDEs. Different APIs exist for mouse devices, tablets, touchpads, joysticks, and touchscreens as each device has unique operating characteristics.

SUMMARY

A motion sensing device can require a special API to define and reveal its own unique operating characteristics. The mechanisms by which testing, debugging, and validation of code development may depend on the device and the API, including the behaviors and properties of the device. A need therefore exists for creating IDEs with APIs that are specific to motion sensing devices.

Embodiments of the invention concern an Integrated Development Environment (IDE) for creating a touchless Virtual User Interface (VUI). The IDE can include a development window for graphically presenting a visual layout of virtual user interface (VUI) components and a descriptor for modifying touchless sensory attributes of the virtual components. The touchless sensory attributes describe how a virtual component responds to touchless sensory events. The IDE can include a touchless sensing unit communicatively coupled to the integration environment for producing a touchless sensing field for interfacing with the IDE. Using the IDE, user components in a User Interface (UI) can be arranged in a visual layout to generate virtual components within the touchless sensing field to produce a VUI. An object moving within the touchless sensing field at a location in the virtual layout corresponding to a virtual component generates a touchless sensory event on a UI component in the User Interface of the IDE. The UI component can respond to a touchless sensory event on a corresponding VUI in accordance with a touchless sensory attribute. For example, a touchless sensory event can be the movement of an object within a certain region, the type of movement, and the duration of movement within the virtual layout. As an example, a touchless sensory attribute can describe how far the object is moves in the virtual layout before an event is triggered.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
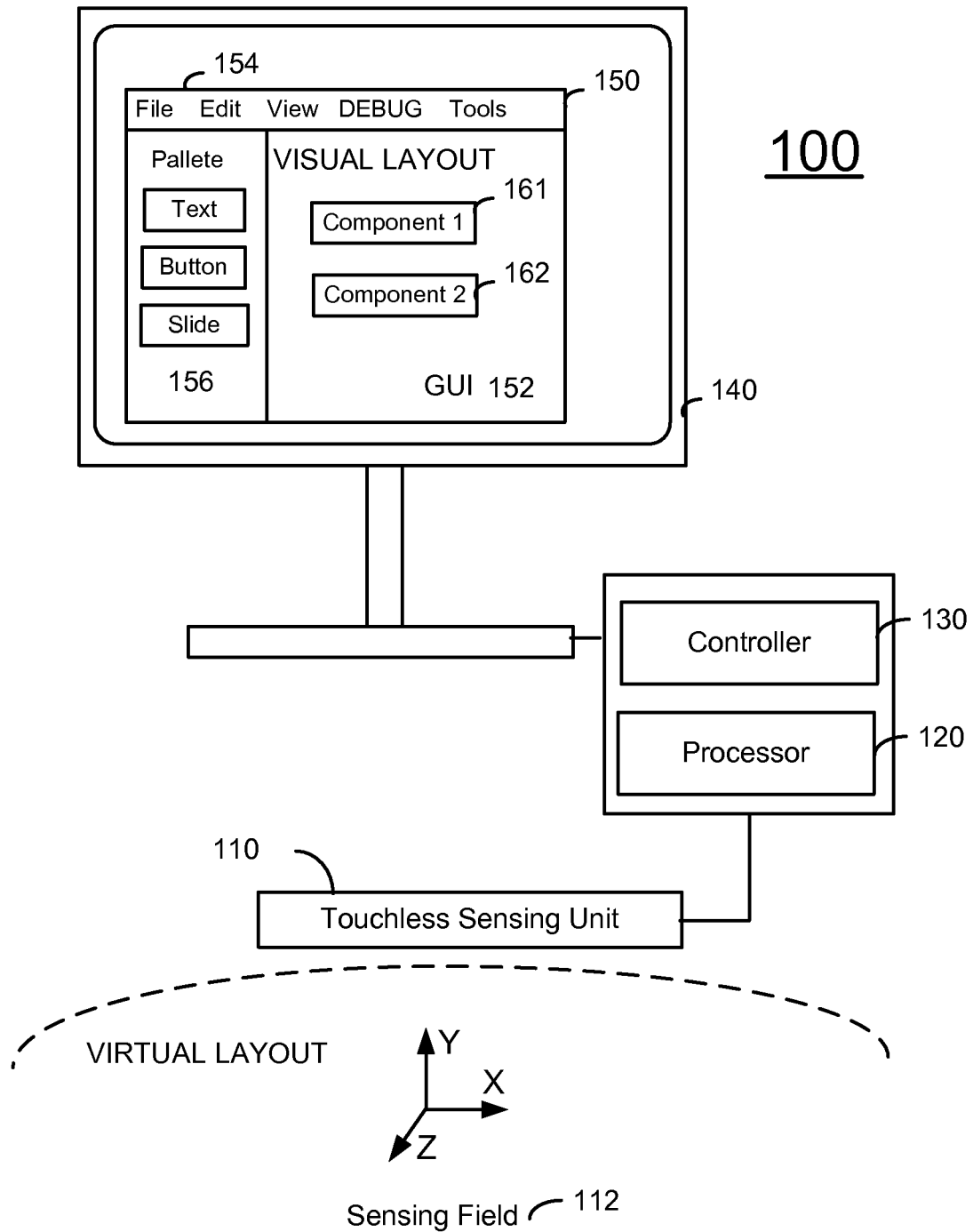
FIG. 1 illustrates a IDE for Virtual User Interface (VUI) development in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The term touchless sensing is defined as sensing movement without physically touching the object causing the movement. The term cursor is defined as a cursor on a display and providing control to an underlying object. The cursor can be a handle to an object in the display, or a physical object remote from the display but visually controlled using the cursor on the display. The term cursor object is defined as an object that can receive coordinate information for positioning the object. The cursor can be a handle to the object, wherein the object can be controlled via the cursor. The term presenting can mean to bring into form, or translate one representation to another representation. The term virtual can mean physically tangible though not generally observable by the senses.

The term User Interface (UI) can be defined as an interface providing access to one or more underlying controls of an application hosted by a computing device. As an example a UI can be a graphical user interface (GUI) that presents one or more graphical components that can perform a control function in response to an applied action. A user component can be an element in a UI that receives the action and performs a function in response to the action. A Virtual User Interface (VUI) can be defined as a touchless user interface having one or more virtual components that perform a function in response to a touchless sensory event applied in a sensing field. As an example, a touchless sensory event can be a touchless pressing action of a finger on a virtual component in a touchless sensing field. A touchless sensory attribute can be broadly defined as a measure of a touchless sensory event, such as a magnitude of the touchless sensory event. A visual layout can be defined as a presentation of user components in a UI that are visible. A virtual layout can be defined as a presentation of virtual components in a VUI that are not directly visible.

In a first embodiment of the present disclosure, an Integrated Development Environment (IDE), executing computer instructions in a computer-readable storage medium of a computer system, for developing a Virtual User Interface (VUI) application, is provided. The IDE can include a development window for graphically constructing a visual layout of a User Inteface (UI) to correspond to a virtual layout of a Virtual User Interface (VUI), and at least one descriptor in the development window that identifies a response of a user interface component in the UI to touchless sensory events applied to a corresponding virtual component in the VUI.

In a second embodiment of the present disclosure, a visual toolkit, executing computer instructions in a computer-readable storage medium of a computer system, for creating a VUI application is provided. The visual toolkit includes a development window that presents a visual layout of re-locatable user components in a User Interface (UI), a touchless sensing unit operatively coupled to the computer system that generates a touchless sensing field, and at least one descriptor in the development window that describes how a user interface component of the UI responds to touchless sensory events applied to a corresponding virtual component in the VUI. An arranging of the re-locatable user components in the UI creates a virtual layout of virtual components in the touchless sensing field for producing the Virtual User Interface (VUI) application.

In a third embodiment of the present disclosure, a computer readable storage medium, having stored thereon a computer program having a plurality of code sections executable by a portable computing device is provided. The computer readable storage medium comprises computer instructions for causing the portable computing device to perform the steps of configuring a virtual layout of virtual components, modifying touchless sensory attributes of the virtual components, and creating a touchless Virtual User Interface (VUI) application in accordance with the configuring of the virtual components and the touchless sensory attributes.

Referring to FIG. 1, an Integrated Development Environment (IDE) 100 for developing Virtual User Interfaces (VUI) is shown. Broadly stated, a VUI is a touchless user interface application that can be deployed across various platforms to provide touchless user interfacing with an underlying application. The IDE 100 can include a development window 150, a toolbar 154, a component palette 156, and a Graphical User Interface (GUI) 152. The GUI 152 can present a visual layout of user interface (UI) components 161-162 selected from the component palette 156. Notably, more than the number of user components can be used in creating the VUI 120, with more functions than those shown. The user components selected from the palette 156 can be arranged in the GUI 152 using drag and drop. The user components 161-162 can be push buttons, text entries, knobs, or sliders but are not herein limited to these. The user interface components (161-162) can be arranged in the GUI 152 to create a VUI having a virtual layout of virtual components corresponding to a visual layout of the user components (161-162). During development, a developer of a VUI application can create a VUI by dragging and dropping user components in the GUI 152. Accordingly, the IDE 100 receives a directive to arrange the virtual components in the touchless sensing field, and updates a configuration of the virtual layout. For example, a developer can create a virtual button component in the touchless sensing field 112 by dragging a UI button 161 component from the palette 156 and positioning it within the GUI 152. The IDE 100 can generate a VUI application that includes the virtual button component at a location in the virtual layout of the sensing field 112 that corresponds to an approximate location of the UI button component in the GUI 152. In such regard, the IDE 100 allows visual development and programming of virtual user interfaces.

In practice, the IDE 100 is a computer programming application that operates from computer instructions executed on a computer readable storage medium. The IDE 100 can include touchless sensing unit 110, a processor 120, a controller 130, and a display 140. The touchless sensing unit 110 can produce a touchless sensing field 112 which will serve as the virtual layout for virtual components during development of a VUI application. Briefly, a developer can arrange user components in a visual layout of the GUI 152 to create a corresponding arrangement of virtual components in a virtual layout of the touchless sensing field 112. The IDE 100 allows the developer to adjust the sensitivity of virtual components activated via touchless finger actions. The touchless sensing unit 110 can detect movement of an object, such as a finger, moving within the touchless sensing field 112 generated by the touchless sensing unit 110.

As an example, the touchless sensing unit 110 can be an array of motion detection elements that generate the touchless sensing field 112. The processor 120 can be communicatively coupled to the touchless sensing unit 110 to identify and track movements of the object within the touchless sensing field 112. The controller 130 can be communicatively coupled to the processor 120 for generating coordinate information from the movements. The controller 130 and the processor 120 can be integrated with the touchless sensing unit 110, or within a computer connected to the display 140. The controller 130 can generate touchless sensory events in response to finger movements in the touchless sensing field 112. In one aspect, the controller 130 can generate a coordinate object that identifies a touchless finger push or release motion in the sensing field 112. The controller 130 can pass the coordinate object to the integrated development environment (IDE) 150.

In one aspect, the touchless sensing field 112 can be considered a two-dimensional layout, wherein an object can move in a horizontal (X) and a vertical (Y) direction. Movement of an object within the X-Y plane can correspond to movement in the vertical and horizontal direction on the display 140. For example, the controller 130 can navigate the cursor on the screen 140 in accordance with object movement in an XY plane of the touchless sensing field 112. When the cursor location is positioned at a location corresponding to a virtual component in the development window, herein called the visual layout, the virtual component can be activated. For example, the controller 130 can detect a location of an object and position the cursor at a location corresponding to the visual layout. In another aspect, movement of the object in a forward and backward direction (Z) can correspond to activation of a behavior on a Virtual components; that is, causing a touchless sensory event. The X, Y, and Z principal axes are interchangeable for providing navigation movement and action behaviors. The IDE allows interchangeability between the principal axes, the scaling, the resolution, and the dimensionality.

The display 140 may support three dimensional (3D) cursory movement such as a Z dimension which allows a cursor to move into and out of the screen. This type of functionality is advantageous within systems such as 3D games wherein a character or object can move if three dimensions, or within medical systems such as 3D surgery environments. Referring back to FIG. 2, movement within the virtual layout can be identified and processed by the processor 120 and controller 130. For example, a physical location within the touchless sensing field 112 corresponds to a location in the virtual layout which in turn corresponds to a location in the visual layout 152. Understandably, the virtual layout is a virtual presenting, or a form or projection, of the visual layout 152 in a touchless sensing field 112.

Figure 2:
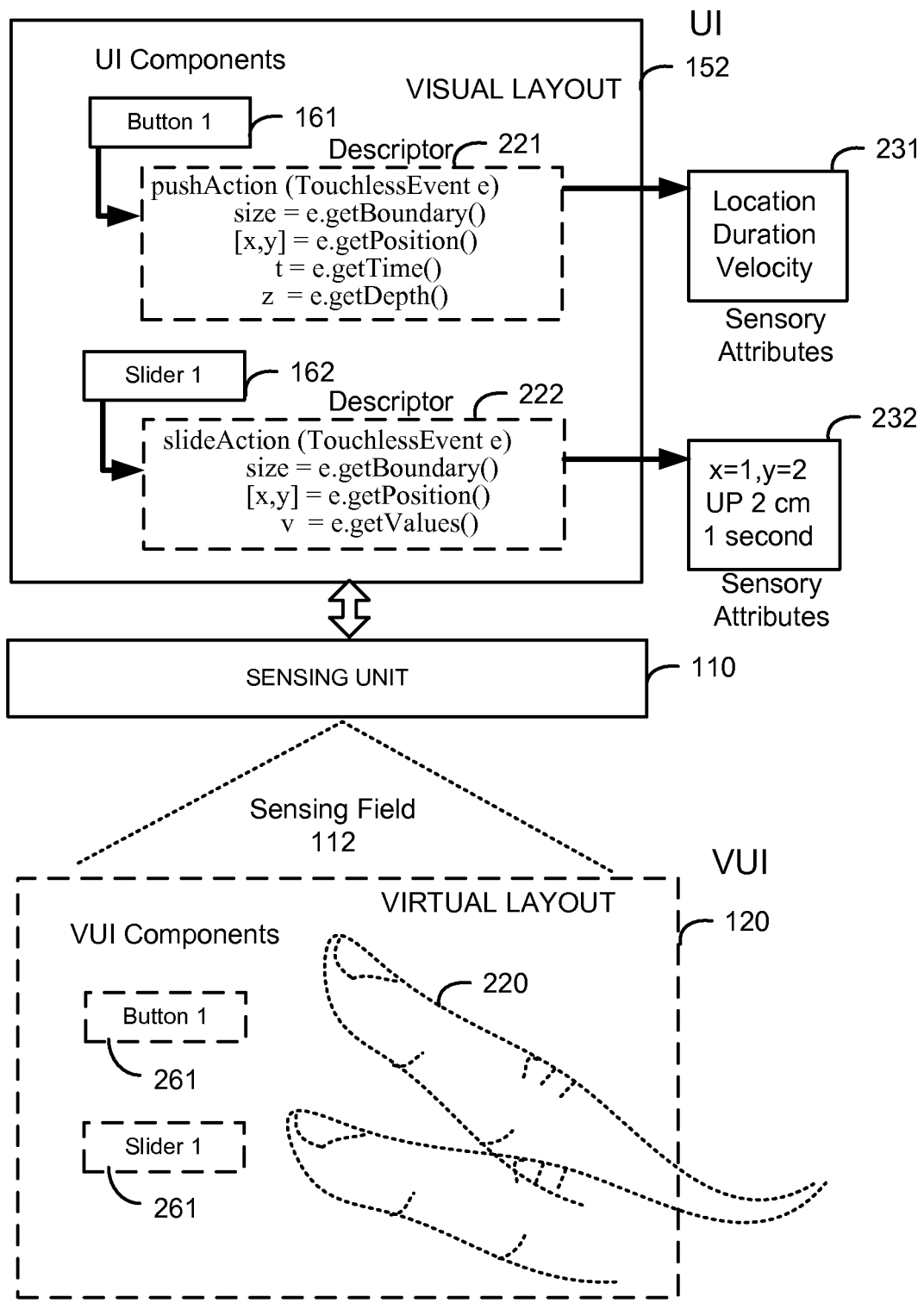
FIG. 2 illustrates a correspondence between a visual layout of a VUI and a virtual layout of a User Interface (UI) in accordance with an embodiment of the inventive arrangements.

Referring to FIG. 2, a correspondence between a visual layout of the GUI 152 and a virtual layout of a VUI 120 is shown. A visual layout is a layout of user components (161-162) within the GUI 152. A virtual layout is a layout of virtual components (261-262) within the VUI 120. The virtual layout is a representation of the visual layout within the touchless sensing field 112. A virtual layout of the VUI 120 in the touchless sensing field 112 corresponds to a visual layout of the GUI 152 within the development window of the IDE 100. The visual layout of the GUI 152 is the layout of user components (161-162) that can be seen in the development window 150 of the IDE 100. The visual layout 152 also corresponds to the visual layout of the VUI application that is created using the IDE 100. The VUI 120 is a realization of the virtual components (261-262) in the touchless sensing field 112.

Again, the IDE 100 is a development window for graphically constructing a visual layout of a Graphical User Interface (GUI) 152 to produce a virtual layout of a Virtual User Interface (VUI) 210. The IDE 100 also provides at least one descriptor 221 to identify a response of a user interface component 161 in the GUI 152 to touchless sensory events applied to a corresponding virtual component 261 in the VUI 120. A touchless sensory event corresponds to a finger action 220 applied to a virtual component 261, such as a pushing action on the virtual push button 261. A touchless sensory event comprises at least one of a touchless finger positioning, a touchless finger push, a touchless finger release, a touchless finger pause, a touchless finger sign, a touchless scroll, and a touchless select, but is not limited to these. The descriptor 221 can include a dialog window 231 that presents at least one modifiable touchless sensory attribute 221 of a touchless sensory event associated with the virtual component 261. A touchless sensory attribute 231 comprises at least one of an absolute location, a duration of time at a location, a relative displacement, a velocity, and an acceleration of a finger in the VUI 120.

As an example, a developer through the dialog window 231 can adjust the sensitivity of a finger press on a virtual pushbutton component 261 for triggering an action on a corresponding user component 161. For instance, a developer during development may increase a depth of a required finger push on the virtual component 261 from 1 cm to 2cm to activate the user component 161. That is, the developer can adjust a touchless sensory attribute of the virtual component 261 using the descriptor 221 of the UI component 161 during the creating of a VUI. For example, a developer can adjust the touchless sensory attributes of a VUI 120 to customize a VUI application for different applications. Moreover, a touchless sensory event on a virtual component 261 can produce one of audio or visual feedback on a corresponding UI component 161 in the display window to provide an indication that a finger action has been recognized.

As example, a developer can create a graphical layout of user components (161-162) in the visual layout (152). For instance, referring to FIG. 1, a developer can position Virtual components Button (161) and Slider (162) within the visual layout of the GUI 152. The developer can see the components as they are arranged in the GUI 152. The sensing unit 110 can project the visual layout 152 as a virtual layout in the touchless sensing field 112 for creating the VUI 120. In practice, the developer may not see how the buttons are arranged in the virtual layout as it is virtual. Accordingly, the developer can position a finger 220 within the touchless sensing field 112 to identify the boundaries of the virtual layout and the Virtual components within the layout. The IDE 100 can graphically identify where the finger is in the virtual layout and present the corresponding location in the GUI 152. The controller 130 identifies a location and movement of the finger 220 within the touchless sensing field 112 and relays the coordinate information to the IDE 100. The IDE 100 can identify the location of the finger 220 in the virtual layout and the corresponding visual layout 152 on the display such that the developer can see where the finger is 220 relative to the visual layout.

Notably, the virtual layout of the GUI 152 and the visual layout of the VUI 120 may have translation differences; that is, the mapping between the two layouts may not be one to one. Understandably, the projection of a virtual layout may encompass a broader space or a narrowed space depending on the sensing field 112, the layouts may also be slightly distorted. The IDE 100 can provide auditory or visual feedback for revealing the location and behavior of the finger within the virtual layout. For example, referring back to FIG. 2, when the finger 220 is positioned at a virtual location corresponding to a Virtual components such as Button 1 (161), the IDE 100 can change a visual or auditory attribute of the virtual component in the visual layout of the GUI 152. The visual attribute can be a change of button color, a flashing of the button, an beep, or any other feedback mechanism. The IDE 100 can provide feedback to the user for showing the bounds of the Virtual components. For example, the IDE 100 can trace out virtual component boundaries on the visual layout. The IDE 100 can show the position of the finger in the virtual layout of the VUI 120 on the visual layout of the GUI 152.

The IDE 100 is a software environment for building virtual user interface (VUI) applications. The IDE provides programming through C, C++, Java, .NET, or Visual Basic. The IDE 100 can receive and process the coordinate object from the controller 130 for informing a software application, such as the Graphical User Interface (GUI) 152, of touchless sensory events in the touchless sensing field 112. A coordinate object can be one of an HTML object, an XML object, a Java Object, a C++ class structure, a .NET object, or a Java Servlet. The IDE 100 can incorporate the coordinate object into programs and modules for providing functionality to the GUI 152. The IDE 100 can compile the program code for the GUI 152 and generate the VUI application. The VUI 152 can be deployed with the touchless sensing unit 110 to provide touchless user interface applications. As an example, the sensing unit 110 can replace or supplement operation a touchscreen or a tablet, and generate a VUI with which a user can interface via touchless finger actions. A VUI application running on a computer system can allow a user to interface a menu system of a communication device or a computer through touchless finger gestures with the touchless sensing unit 110. As another example, a VUI application can allow a user to adjust one or more media controls of a media device via touchless finger actions.

One benefit of the IDE 100 is that the developer can evaluate the resolution and precision of the touchless actions involved in generating a touchless sensory event on a virtual component. A sensory event can be a touchless finger action such as touchless button press, a touchless button release, a touchless button hold, a touchless scroll, a touchless single click, and a touchless double click. The descriptor 231 allows for a modifying of a touchless sensory attribute of a virtual component, wherein the touchless sensory attribute describes how a virtual component responds to a touchless touchless sensory event. The descriptor 231 can be a dialog window comprising at least one modifiable touchless sensory attribute of a touchless sensory event associated for a virtual component.

As an example, the descriptor 231 can expose sensory attributes of the touchless sensory event. For example, the sensory event may be a finger action applied to a virtual button 261. The location of the detected finger action can be presented in a coordinate object identifying the touchless sensory event. A sensory attribute can be the coordinate values, the size of the virtual component boundary, and the type of action. For example, descriptor 221 reveals a pushAction was detected, whereas, descriptor 222 reveals that a slideAction was detected. An exception handler routine in the IDE 100 can provide coordinate information relevant to the sensory event, such as how far the slider moved, or how far the button was pushed. A developer can integrate the functions and methods provided by the descriptors in conjunction with the exception handlers to identify when sensory events are detected. A VUI application can implement methods of a user component sby extending the exception handling methods through inheritance. A virtual component 261 can extend a user component 161 to inherent touchless sensory event methods. Accordingly, sensory event information such as displacement, velocity, acceleration, and length of time, can be processed to process the sensory event within the context of the VUI.

Briefly, the touchless sensing unit 110 together with the processor 120 and controller 130 communicate touchless sensory events to the IDE for invoking at least one user component response. The touchless sensory event is at least one of a finger positioning, a finger movement, a finger action, and a finger hold, within the touchless sensing field. In one aspect, a touchless sensory attribute includes at least one of an absolute location, a duration of time, a relative displacement, a velocity, and an acceleration of the finger. This information can be provided through the descriptor which can be edited or left intact by the developer within the IDE 100. Understandably, the developer can adjust the sensitivity of Virtual components with the VUI. In one example, the Virtual components can be Java Beans. The Java Beans specify parameters and attributes available for the touchless sensory event.

During execution, the computer system presenting the VUI application receives touchless sensory events from the touchless sensing unit 110. The touchless sensing unit 110 generates the touchless sensory events in response to touchless finger actions on virtual components in the VUI 120, and the computer system applies the touchless sensory events to the user components in the GUI 152 based on the touchless sensory attributes in the descriptors (231-232). In such regard, the IDE 100 allows a developer to compose a virtual layout of virtual components and tune the VUI application for touchless user interface sensitivities. The virtual layout can be considered a projection of the visual layout in a two-dimensional or three-dimensional space. Understandably, the visual layout 152 is represented in two dimensions on the display 140 as limited by the graphics of the display. In one example, the touchless sensing unit 110 can project the visual layout 152 onto a two-dimensional plane in a three-dimensional space. Alternatively, the touchless sensing unit 110 can project the visual layout 152 onto a surface such as a desk.

In one embodiment, the IDE can further include a form sheet. A touchless sensing unit can project the visual layout containing the Virtual components onto the form sheet. This allows the form sheet to display visual components in a visible layout corresponding to the Virtual components in the virtual layout. The virtual layout may become visible as a result of a touchless sensory projection, displaying, or printing on a form sheet. The virtual components within the virtual layout can correspond to visual components in the visual layout. In this arrangement a user can touch the form sheet at a location in the visible layout corresponding to elements within the virtual layout for interacting with Virtual components. The IDE can further include a controller for correlating an object action such as a finger action on the form sheet with a virtual component to allow a user to rearrange or access functionality of the Virtual components in the development window.

Figure 3:
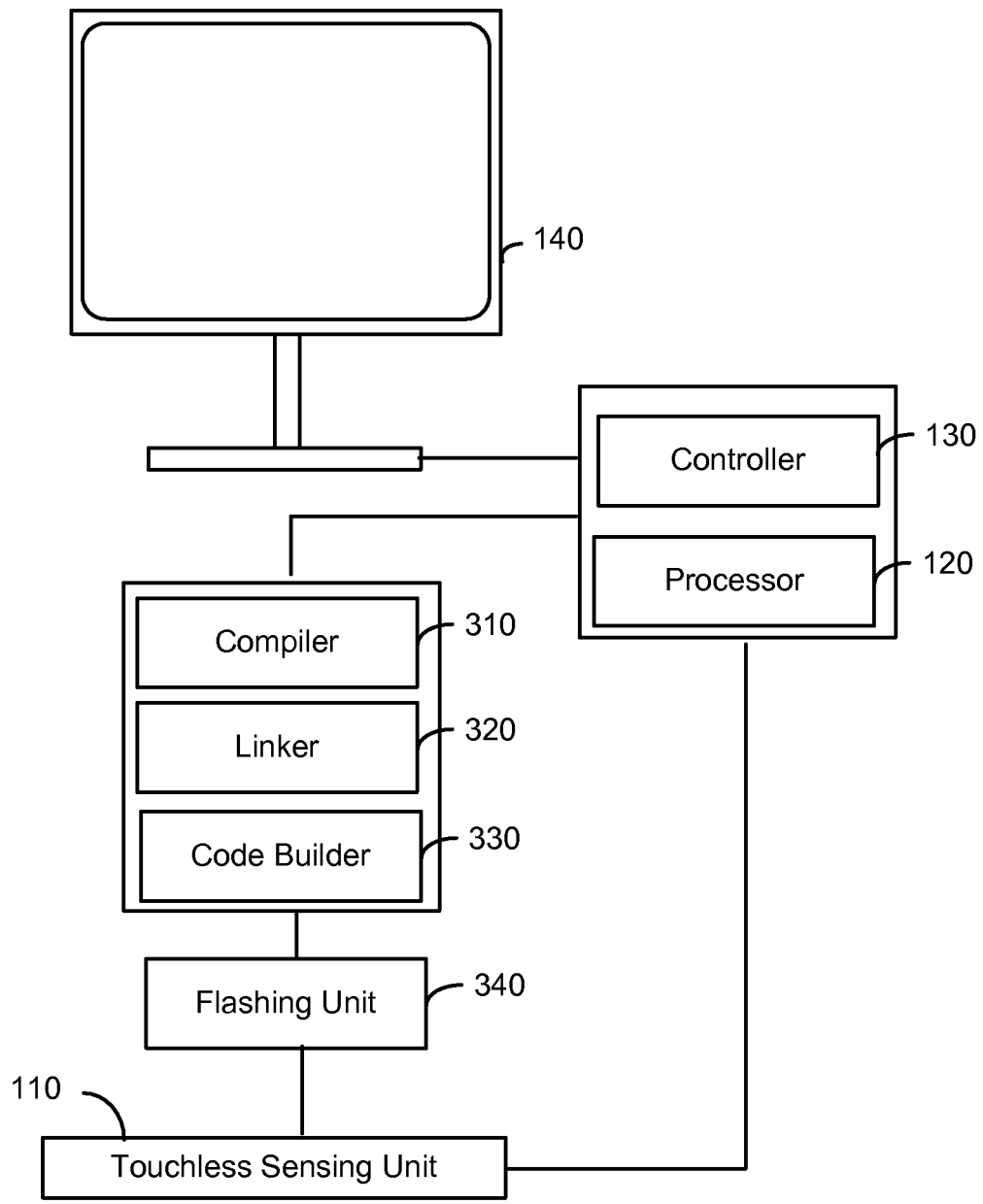
FIG. 3 depicts a visual toolkit for generating VUI object code in accordance with an embodiment of the inventive arrangements.

Referring to FIG. 3, the IDE 100 can further include a compiler 310 for compiling a source code of the GUI 152 into at least one code object, a linker 320 for converting the code object into relocatable code, and a code builder 330 for building the relocatable code into a VUI executable object. The source code can contain variables and functions each having associated memory requirements. For example, the variables can be stored in X or Y RAM, and the functions which collectively constitute the program can be stored in P RAM.

The compiler 310 may leave the locations of the memory ambiguous as relocatable code objects as the target platform may have certain memory requirements. For example, different chips have different regions of memory dedicated to data memory and program memory. Accordingly, the linker 320 identifies the regions of memory targeted for the particular processor or device using the VUI application. The linker 320 links the relocatable section of memory produced by compiler 310 into fixed locations in the target device memory. The Code Builder 330 can convert the source code and targeted memory into a VUI executable object. A computer system can run the VUI executable object to generate the VUI application. The sensory system 100 also includes a Flashing Unit 340 for placing the VUI executable object generated by the Code Builder 330 in the touchless sensing unit 110 or any other computer system. The VUI application depends on the reception of sensory events which are provided by the touchless sensing unit 110. The flashing unit 330 downloads the VUI executable object into the touchless sensing unit such that the sensing unit can communicate sensory events to an underlying application, or other computer system hosting the application. The flashing unit 330 can download the executable through a serial port, a USB, a Bluetooth, or a ZigBee connection, through are not limited to these.

The IDE 150 can serve as a visual toolkit, executing computer instructions in a computer-readable storage medium of a computer system, for creating a coordinate object for use in a VUI application. The visual toolkit (152) includes the development window 150 that presents a visual layout of re-locatable user components in a User Interface (UI), the touchless sensing unit 110 that generates a touchless sensing field and provides coordinate information to the development window, and at least one descriptor 221 in the development window that describes how a user interface component of the UI responds to touchless sensory events applied to a corresponding virtual component in the VUI. An arranging of the re-locatable user components (161 -162) in the UI 152 creates a virtual layout of virtual components in the touchless sensing field 112 for producing the Virtual User Interface (VUI) 120 application.

The touchless sensing unit 110 communicates touchless sensory events in the virtual layout to the user components in the GUI 152. The visual toolkit is a software program that can be written in C, C++, Java, .NET, Visual Basic, or CGI. The visual toolkit can include touchless sensory API help documentation, and it can selectively obfuscate code. The visual toolkit includes the compiler 310 for compiling a source code into at least one code object, the linker 320 for converting the code object into relocatable code, and the code builder 330 for building the relocatable code into an executable. In practice, the visual toolkit identifies a finger action within a touchless sensing field of the touchless sensing unit that corresponds to a touchless sensory event action on a user component, such that a user navigates and controls the VUI application through touchless finger control in the touchless sensing field 112.

The visual toolkit can implement a sensory Application Programming Interface (API) for providing portability across computing platforms, wherein the sensory API exposes methods, fields, event listeners, and event handlers for processing touchless finger actions in the VUI 120. In such regard, the VUI 120 can be communicatively coupled to the IDE through the Sensory API. The Sensory API is portable across applications and describes how touchless sensory events are handled at the service level or application layer. A developer of a VUI application need not know how resources are allocated to the event driven model when a touchless finger action is performed. A developer need only implement the sensory API to receive events and process the events accordingly.

Figure 4:
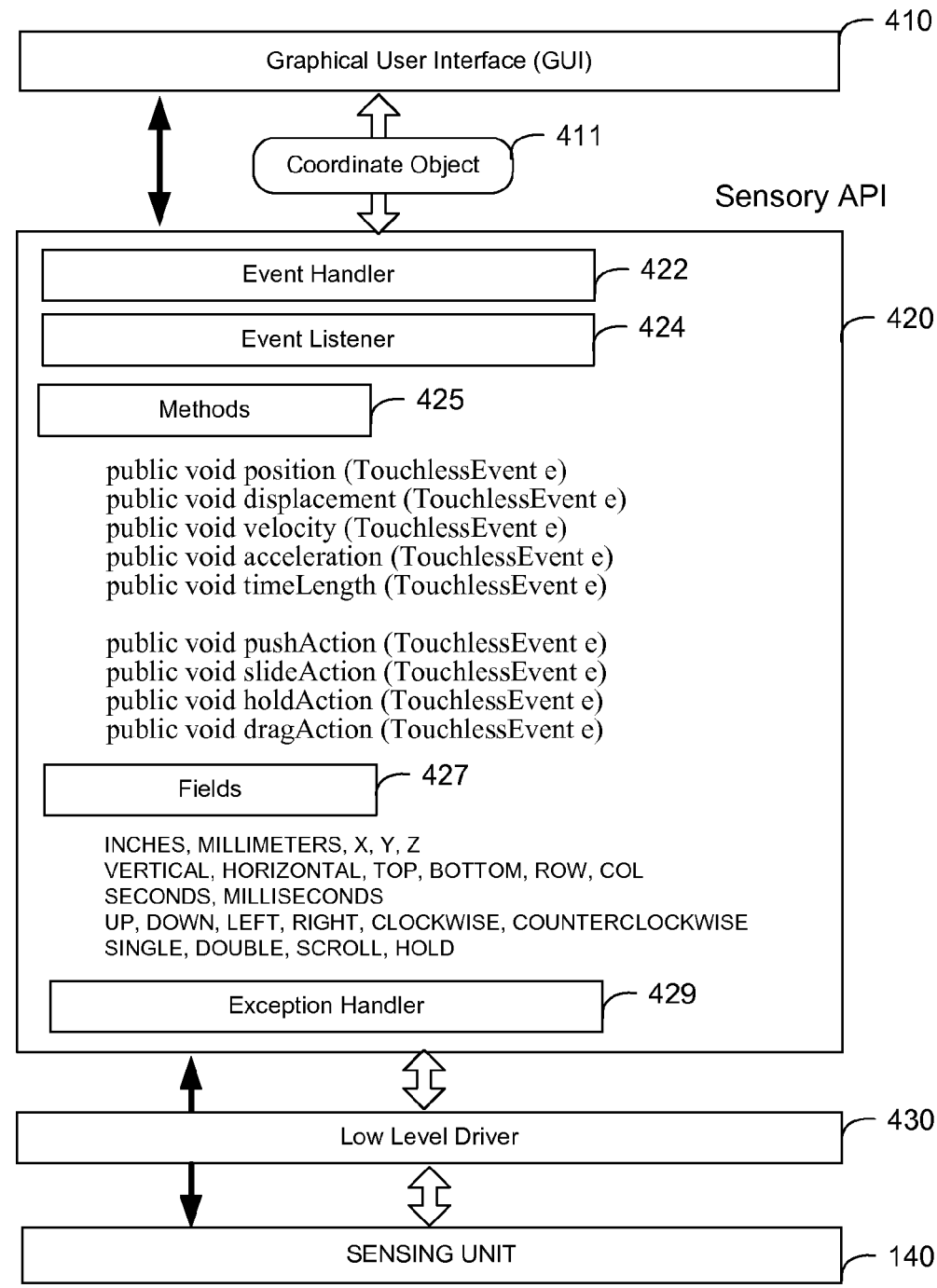
FIG. 4 depicts a touchless sensory API suitable for use in an IDE in accordance with an embodiment of the inventive arrangements.

Referring to FIG. 4, a Virtual user interface (VUI) application 400 is shown. The VUI application can include a GUI 410, a sensory Applications Programming Interface (API) 420, a low level driver 430, and a sensing unit 440. The VUI is not limited to these components and may include fewer or more than the components shown. The sensing unit 440 can detect sensory events and relay the sensory event through the low level driver 430 to the sensory API 420. The low level driver 430 can package the object movement events into a coordinate object 411 which describes attributes of the object such as position, displacement, velocity, and acceleration. The low-level driver can be written in machine language, assembly, C, C++, or Java and define base classes that include methods 425 and fields 427 to expose the coordinate and control data produced by the sensing unit 440. The low-level driver converts a touches sensory event on a virtual component in the VUI to an action on a user component in the UI. The low-level driver can be one of a tablet driver, a touchpad driver, a touchscreen driver, and a mouse driver. A sensory event can be any movement of an object within a sensory field of the sensing unit 440. In one particular example, an object movement can be a finger press, a finger release, a finger hold, or any other touchless action for interacting with the GUI 410. The object movement can be intentional or accidental. The API 420 can interpret the sensory events and translate the sensory events into a response action within the GUI 410. In practice, the GUI implements the sensory detection API 120 for receiving sensory events. The API 420 can include an event handler 422 for processing a sensory event and an event listener 424 for receiving a sensory event. The sensory event listener can identify a sensory event and report the event to the sensory event handler. The API 420 can also include an exception handler 429 to indicate and handle an unexpected sensory event.

In this document, the terms "computer program", "program ", "computer program medium," "computer-usable medium," "machine-readable medium", ," "machine-readable storage medium" and "computer-readable medium" are used to generally refer to media such as memory and non-volatile program memory, removable storage drive, a hard disk installed in hard disk drive, and signals. These computer program products are means for providing software to processing devices. The computer-readable medium allows devices to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is VUIted. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. An Integrated Development Environment (IDE), executing computer instructions in a computer-readable storage medium of a computer system, suitable for use in developing a Virtual User Interface (VUI) application, the IDE running on the computer system and comprising:
   a development window for graphically constructing a visual layout of a User Inteface (UI) to correspond to a virtual layout of a Virtual User Interface (VUI) generated by an ultrasonic sensing unit externally coupled to the computer system and with its own targeted processor and memory for receiving executable program code compiled from the IDE specific to instructions of the targeted processor; and
   at least one descriptor that identifies a response of a user interface component in the UI to touchless sensory events applied to a corresponding virtual component in the VUI generated by the ultrasonic sensing unit,
   a compiler for compiling a source code of the VUI application into at least one code object using imported target processor and memory configurations from the ultrasonic sensing unit;
   a linker for converting said code object into relocatable code based on the targeted processor and memory of the ultrasonic sensing unit;
   a code builder for building said relocatable code into an executable code object; and
   a flashing module for managing a down loading of the executable program code object over a connection into a flash memory of the externally coupled ultrasonic sensing unit associated with the target processor and memory,
   where the computer system is communicatively coupled to the ultrasonic sensing unit by a wired or wireless connection for developing the VUI on the computer and down loading the executable code object into the ultrasonic sensing unit.

2. The IDE of claim 1, further comprising a component palette having user components that are dragged and dropped in the UI to create Virtual components in the VUI.

3. The IDE of claim 1, further comprising a dialog window that presents at least one modifiable touchless sensory attribute of a touchless sensory event associated with a virtual component.

4. The IDE of claim 1, wherein a touchless sensory attribute comprises at least one of an absolute location of a finger, a duration of time of a finger at a location, a relative displacement of a finger, a velocity of a finger, and an acceleration of a finger in the VUI.

5. The IDE of claim 1, wherein a touchless sensory event comprises at least one of a touchless finger positioning, a touchless finger push, a touchless finger release, a touchless finger pause, a touchless finger sign, a touchless scroll, and a touchless select.

6. The IDE of claim 1, wherein the computer system receives touchless sensory events from the ultrasonic sensing unit producing a touchless sensing field,
   wherein the ultrasonic sensing unit generates the touchless sensory events in response to touchless finger actions in the VUI where there are no markers, fixtures, gloves, or objects in physical contact with the finger.

7. The IDE of claim 1, wherein a touchless sensory event on a virtual component produces one of audio or visual feedback on a corresponding UI component in the display window.

8. The IDE of claim 2, further comprising a form sheet, wherein said ultrasonic sensing unit visually projects the virtual layout containing the Virtual components on the form sheet.

9. The IDE of claim 1, where
   the linker for converting said code object into relocatable code identifies regions of memory targeted by the processor of the ultrasonic sensing unit, and links the relocatable code to those regions of memory including the at least one descriptor; and
   the code builder for building said relocatable code into an executable code object that accesses the targeted memory of the processor in the external ultrasonic sensing unit and at least one descriptor on the ultrasonic sensing device.

10. The IDE of claim 9, where
    the flashing module resides on the computer system and is temporarily coupled to the ultrasonic sensing unit for loading the executable program code object with the at least one descriptor into the flash memory of the ultrasonic sensing unit via the wired or wireless connection.

11. The IDE of claim 10, further comprising at least one of:
    a cable for connecting said IDE to the ultrasonic sensing unit; and
    a wireless device for temporarily connecting said IDE to a the ultrasonic sensing unit to perform wireless flashing, wherein the flashing module manages the download of the executable program code object over a serial port, a USB, a Bluetooth, or a ZigBee connection.

12. A visual toolkit, executing computer instructions in a computer-readable storage medium of a computer system running on the computer system, the visual toolkit comprising:
- a development window that presents a visual layout of re-locatable user components in a User Interface (UI);
- at least one descriptor in the development window that describes how a user interface component of the UI responds to touchless sensory events received from an ultrasonic sensing unit unit externally coupled to the computer system and with its own targeted processor and memory for receiving executable program code compiled by the visual toolkit;
- a compiler for compiling a source code of the User Interface into at least one code object using imported target processor and memory configurations from the ultrasonic sensing unit;
- a linker for converting said code object into relocatable code based on the targeted processor and memory of the ultrasonic sensing unit;
- a code builder for building said relocatable code into an executable code object on the computer system; and
- a flashing module for managing a down loading of the executable code object over a connection into a flash memory of the externally coupled ultrasonic sensing unit associated with the target processor and memory,
- wherein the ultrasonic sensing unit is externally coupled to the computer system via a wired or wireless connection and generates a touchless ultrasonic sensing field with a Virtual User Interface (VUI) from the at least one descriptor and the visual layout;
- wherein an arranging of the re-locatable user components in the UI creates a virtual layout of virtual components in the touchless sensing field for producing the Virtual User Interface (VUI) generated by the ultrasonic sensing unit.

13. The visual toolkit of claim 12, wherein executable code object of the VUI application represents the visual layout in the UI.

14. The visual toolkit of claim 12, wherein the executable code object is a compiled: Java program, C++ program, or .NET program.

15. The visual toolkit of claim 12, wherein the visual toolkit provides programming through C, C++, Java, or .NET, and
- wherein the flashing module manages the download of the executable program code object over a serial port, a USB, a Bluetooth, or a ZigBee connection.

16. The visual toolkit of claim 12, wherein the driver converts a touches sensory event on a virtual component in the VUI to an action on a user component in the UI.

17. The visual toolkit of claim 12, wherein the visual toolkit implements a sensory Application Programming Interface (API) for providing portability across computing platforms, wherein the sensory API exposes methods, fields, event listeners, and event handlers for processing touchless finger actions in the VUI directed to the executable code in the ultrasonic sensing unit.

18. A system comprising:
- an ultrasonic sensing unit with its own targeted processor and memory for producing a sensing field and generating touchless sensory events response to touchless finger actions in the sensing field, where there are no markers, fixtures, gloves, or objects in physical contact with the finger;
- an Integrated Development Environment (IDE) running on a computer, the IDE comprising:
  - a development window for graphically constructing a visual layout of a User Inteface (UI) to correspond to a virtual layout of a Virtual User Interface (VUI) generated by the ultrasonic sensing unit that is externally coupled to the computer system to receive executable program code compiled from the IDE specific to the targeted processor and memory;
  - a compiler for compiling a source code of the User Interface into at least one code object using imported target processor and memory configurations from the ultrasonic sensing unit;
  - a linker for converting said code object into relocatable code based on the targeted processor and memory of the ultrasonic sensing unit;
  - a code builder for building said relocatable code into an executable code object on the computer system;
  - a flashing module for managing a down loading of the executable code object over a connection into a flash memory of the externally coupled ultrasonic sensing unit associated with the target processor,
- and, a wireless communication link between the IDE and the ultrasonic sensing unit for developing the VUI on the IDE and loading the executable code object onto the flash memory of the externally coupled ultrasonic sensing unit by way of the flashing module,
  - wherein an arranging of the re-locatable user components in the UI creates a virtual layout of virtual components in the ultrasonic sensing field for producing the Virtual User Interface (VUI) generated by the ultrasonic sensing unit.

* * * * *